Dec. 25, 1923.  
F. D. BLAUVELT  
VALVE  
Filed Jan. 12, 1923  
1,478,815
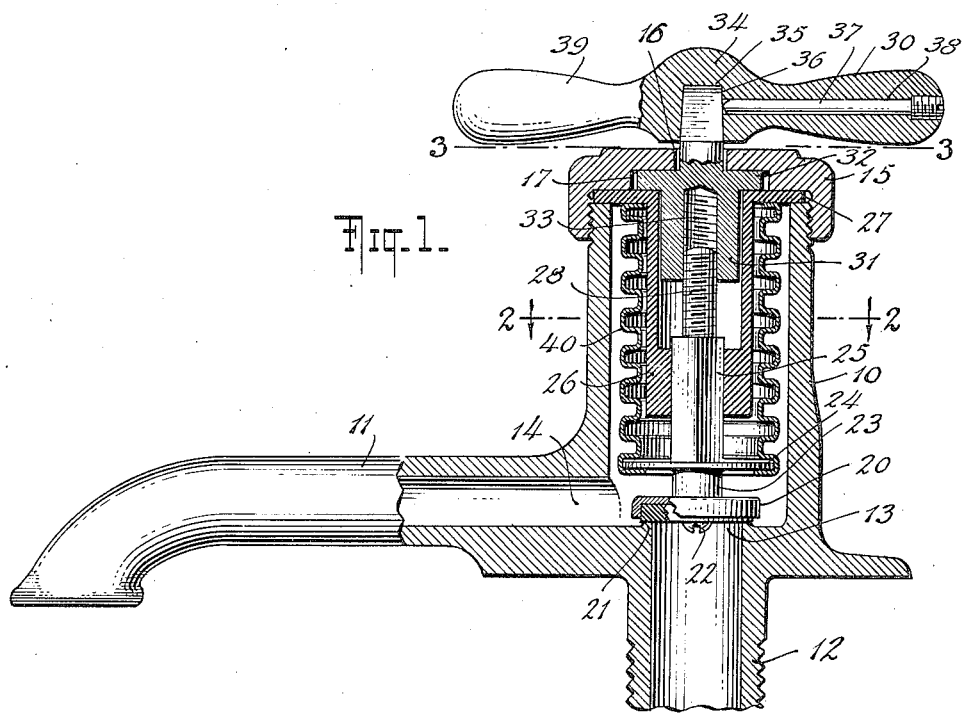
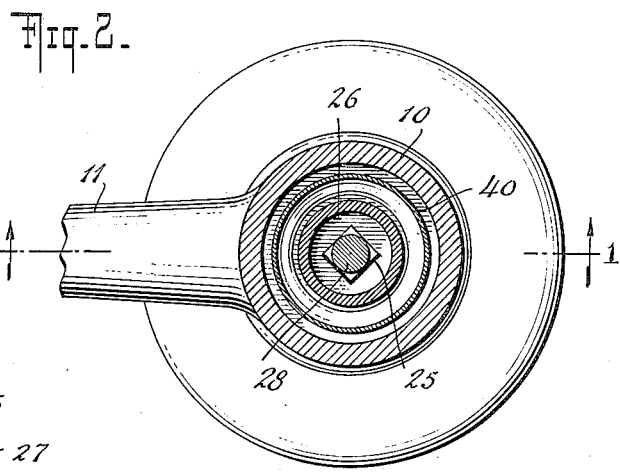
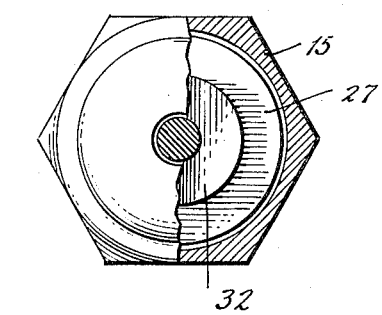
INVENTOR.  
Frederic D. Blauvelt  
BY  
his ATTORNEY.

Patented Dec. 25, 1923.

1,478,815

UNITED STATES PATENT OFFICE.

FREDERIC D. BLAUVELT, OF GLEN RIDGE, NEW JERSEY.

VALVE.

Application filed January 12, 1923. Serial No. 612,178.

*To all whom it may concern:*

Be it known that I, FREDERIC D. BLAUVELT, a citizen of the United States, residing at Glen Ridge, in the county of Essex and State of New Jersey, have invented certain new and useful Improvements in Valves, fully described and represented in the following specification and the accompanying drawings, forming a part of the same.

This invention relates to valves, and aims to provide a durable valve of attractive appearance, which may be constructed at relatively small cost.

An object of the invention is to increase the strength and durability of packless valves, that is to say, of valves in which a bellows diaphragm, most desirably of corrugated cylindrical form, replaces the ordinary packing, by elimination of all danger of torsional strains on the diaphragm.

Another object of the invention is to provide a valve in which the operating handle is at all times close to the valve body so as to give the valve a neat and attractive appearance which is of especial value when the valve is used in basin faucets and the like.

The invention contemplates the construction of a valve with an endwise movable valve stem which is held against rotation, and is actuated by a rotatable operating stem which is held against longitudinal movement. The invention includes also other features of construction and arrangement which may best be understood by a detailed description of the specific embodiment of the invention which is illustrated in the accompanying drawings.

The drawings show a basin faucet valve embodying the invention.

Fig. 1 is a side view of the faucet valve sectioned on the line 1—1 of Fig. 2;

Fig. 2 is a horizontal section of the valve on the line 2—2 of Fig. 1;

Fig. 3 is a partial top view of the valve showing the stem of the operating means sectioned on the line 3—3 of Fig. 1, and the cap of the valve body partly broken away.

The body of the valve shown in the drawings consists of a cylindrical casing 10 formed with a basin spout 11 and a supply connection 12 and inlet opening 13, and closed at its upper end by a cap 15 having a central opening 16.

The flow of fluid through the inlet opening 13 is controlled by a valve head 20 for which a seat 21 is provided around the opening. The valve head 20 is secured by means of a screw 22 to one end of a valve stem 23. A disc 24 is provided on the valve stem 23 and the portion 25 of the valve stem above this disc is square in cross-section. This portion 25 of the valve stem is slidably mounted in a square hole formed at the end of a sleeve 26. This sleeve has at its upper end a flange 27 which is clamped between the cap 15 and the upper end of the casing 10 so as to hold the sleeve 26 in fixed position within the valve body.

The valve stem 23 is moved longitudinally to raise the valve head 20 from its seat and return it thereto by means of a rotary operating mechanism which includes a handle 30 outside the valve body, a rotary stem 31 which extends through the opening 16 of the cap 15 and supports the handle 30, and a flange 32 formed on the stem 31 and seated in a central recess 17 formed on the inner side of the cap 15. By engagement with the cap 15 and the flange 27 of the sleeve 26, the disc 32 restrains the rotary stem 31 against axial movement. A threaded connection is provided between the rotary operating stem 31 and the endwise movable valve stem 23. In the construction shown, this connection is provided by forming the stem 23 with a threaded end 28 entering a threaded bore 33 formed in the lower end of the rotary stem 31.

Since the rotary stem 31 has no axial movement, only a slight clearance need be allowed between the lower side of the handle 30 and the upper side of the cap 15. The handle 30 is constructed in such manner that it may be mounted close to the cap. The hub 34 of the handle 30 contains a blind square hole 35, which fits over a squared end portion 36 of the stem 31. The handle is secured on the stem by a set screw 37 screwed into a longitudinal bore 38 in one of a plurality of radial arms 39 extending out from the hub 34. It is apparent that the arrangement described eliminates the necessity of a collar below the arms 39 of the handle such as is usually provided for the set screw, and thus permits placing the arms of the handle close to the upper surface of the cap 15.

Leakage of fluid through the opening 16 about the rotary stem 31 is prevented by a corrugated cylindrical diaphragm, or bellows, 40, which is best made of flexible metal, such as an alloy of cooper. The bellows 40 is capable of longitudinal expansion and contraction, but the material of which it is made is so thin that the bellows cannot with safety resist any considerable torsional strains. The upper end of the bellows is secured by soldering or otherwise to the under side of the flange 27 of the sleeve 26; and its lower end is secured to the valve stem 23 by soldering or otherwise attaching it to the disc 24.

The valve is operated in the same way as an ordinary screw valve, by turning the handle 30. Rotation of the valve stem 23 being prevented by engagement of the square portion 25 thereof in the square hole in the sleeve 26, rotary movements given to the handle 30 and the rotary stem 31 cause longitudinal movements of the valve stem 23, moving the valve head 20 to and from its seat. During the operation of the valve, the stem 23 and valve head are not turned, and the stem 31 has no endwise movement, and the handle 30 remains at all times close to the top of the cap 15.

In the operation of the valve, the bellows 40 is longitudinally extended and contracted. No torsional strain is, however, applied to the bellows in the operation of the valve since the upper end of the bellows is secured to the flange 27 which is fixed in the valve body, and its lower end is connected to the valve stem 23 which has an endwise but no rotary movement. Furthermore, the bellows cannot be injured by contracting it to too great an extent since the upward movement of the valve stem 23 is limited by the engagement of the upper end of the squared portion 25 with the lower end of the rotary stem 31.

From the above description, it is apparent that the invention provides an improved packless valve in which the metal bellows is protected from all strains which might injure it. Furthermore, certain features of the invention may advantageously be used independently of a bellows.

What is claimed is:

1. A valve, comprising a casing including a body portion open at one end and a screw cap closing the open end of the body portion, a sleeve within the casing having a flange at its outer end held between the open end of the body and the cap, a corrugated cylindrical diaphragm secured at one end to said sleeve and extending inward beyond the inner end of the sleeve, a valve stem to which the inner end of the diaphragm is secured and which is held against rotation but permitted to move endwise by engagement with the inner end of the sleeve, a rotatable operating stem extending through an opening in the cap and held against axial movement and having a threaded connection with the valve stem, whereby rotation of the operating stem will cause endwise movement of the valve stem.

2. A valve, comprising a casing including a body portion open at one end and a screw cap for closing the open end of the body portion, a sleeve within the casing having a flange at its outer end held between the open end of the body and the cap, a corrugated cylindrical diaphragm secured at one end to the sleeve and extending inward beyond the inner end of the sleeve, a valve stem to which the inner end of the diaphragm is secured and which is held against rotation but permitted to move endwise by engagement with the inner end of the sleeve, a rotatable operating stem extending through an opening in the cap and having a flange extending between the outer end of said sleeve and the cap to hold the operating stem against axial movement, the operating stem and the valve stem being axially aligned and having one a threaded bore and the other a threaded end extending into said threaded bore, whereby rotation of the operating stem will cause endwise movement of the valve stem.

3. A valve, comprising a casing, a valve stem mounted within the casing, a support removably mounted within the casing and providing a guide for holding the valve stem against rotation while permitting endwise movement thereof, a corrugated cylindrical diaphragm having one of its ends connected to said support and having its other end connected to the valve stem, a rotary operating member extending through an opening in the casing and held against axial movement and having a threaded connection with the valve stem whereby rotation of the operating member will cause endwise movement of the valve stem.

In testimony whereof I have hereunto set my hand in the presense of two subscribing witnesses.

FREDERIC D. BLAUVELT.

Witnesses:
 ALBERT JARECKY,
 LILLIAN R. Fox.